United States Patent [19]

Rapps et al.

[11] 4,420,971
[45] Dec. 20, 1983

[54] DEVICE FOR FLOWTHROUGH RATE MEASUREMENT IN AN INTERNAL COMBUSTION ENGINE

[75] Inventors: Peter Rapps, Karlsruhe; Ulrich Drews, Vaihingen, both of Fed. Rep. of Germany

[73] Assignee: Robert Bosch GmbH, Stuttgart, Fed. Rep. of Germany

[21] Appl. No.: 274,992

[22] Filed: Jun. 18, 1981

[30] Foreign Application Priority Data

Jun. 18, 1980 [DE] Fed. Rep. of Germany ....... 3022685

[51] Int. Cl.³ .............................................. G01F 1/68
[52] U.S. Cl. ......................................... 73/118; 73/204
[58] Field of Search ............. 73/118 A, 204; 219/412, 219/499

[56] References Cited

U.S. PATENT DOCUMENTS 4,196,622  4/1980  Peter ..................................... 73/204
4,341,114  7/1982  Plapp ..................................... 73/204

Primary Examiner—Herbert Goldstein
Attorney, Agent, or Firm—Edwin E. Greigg

[57] ABSTRACT

A device is proposed for measuring the flowthrough rate in an internal combustion engine, particularly for measuring the air throughput in the intake tube. The device has a measurement bridge functioning on the principle of constant-temperature control, and also a regulating deivce for the total bridge current during the burn-off phase of the hot wire or hot film as one of the bridge resistors. The essential feature is that the bridge circuit assembly comprises at least three voltage dividers; for the purpose of regulating the electric current in the burn-off phase and during measurement operation, respective control voltages are picked up between two different voltage dividers.

8 Claims, 5 Drawing Figures

DEVICE FOR FLOWTHROUGH RATE MEASUREMENT IN AN INTERNAL COMBUSTION ENGINE

CROSS-REFERENCE TO RELATED PRIOR ART

There are no patents or printed publications having a bearing on the patentability of the present invention, but of interest are the following:

German Offenlegungsschrift No. 27 50 050

The above reference taken and viewed singly is believed not to have a bearing on the patentability of any claim of this invention.

BRIEF SUMMARY OF THE INVENTION

The present invention relates to an improved bridge circuit assembly having at least three voltage dividers for the purpose of selectively regulating electric current during burn-off or measurement operations so that control voltages may be picked up between two different voltage dividers thereof.

BACKGROUND OF THE INVENTION

A device for measuring air throughput in an intake tube of an internal combustion engine, which has a hot wire disposed in a bridge circuit, has been known. By regulating the electric current, this hot wire is held to a constant excess temperature relative to the temperature of the aspirated air, and a voltage which serves as the measurement signal may be picked up at one of the bridge resistors.

The independence of the measurement voltage from the temperature of the aspirated air is attained by having not only the hot wire but also a further resistor of the bridge circuit be dependent on temperature. When this measuring device is used during vehicle operation, soil particles are deposited on the hot wire. As a result, the known device provides that the hot wire be subjected from time to time to a high current in order to burn off these deposits. This burn-off procedure is realized via a specific bridge imbalance, which thus causes an increased flow of electric current through the hot wire.

In the known device, this is effected by switching a further resistor parallel to one of the bridge resistors upon the occurrence of a trigger signal. As a result, the regulating amplifier causes the hot wire to assume a higher excess temperature relative to the aspirated-air temperature.

However, it is found by the present invention to attain an optimal burn-off of the hot wire, the specific wire temperature must be adjusted as precisely as possible. If the burn-off temperature is dependent on the aspirated-air temperature, as is the case in the known devices, then the wire will not be sufficiently well cleaned when the ambient temperature is low; alternatively, if the ambient air temperature is high, the hot wire might be damaged.

OBJECT AND SUMMARY OF THE INVENTION

The device according to the invention enables a control of electric current such as to attain a constant temperature at the hot wire during burn-off procedures; in particular, this temperature is not dependent on the aspirated-air temperature.

The invention will be better understood and further objects and advantages thereof will become more apparent from the ensuing detailed description of preferred embodiments taken in conjunction with the drawings.

DESCRIPTION OF THE PREFERRED EMBODIMENTS

The exemplary embodiments pertain to devices for measuring the air throughput in the intake tube of internal combustion engines. The basis for this in the prior art, in terms of the fundamental layout, is found in German Offenlegungsschrift No. 27 50 050.

Figure 1:
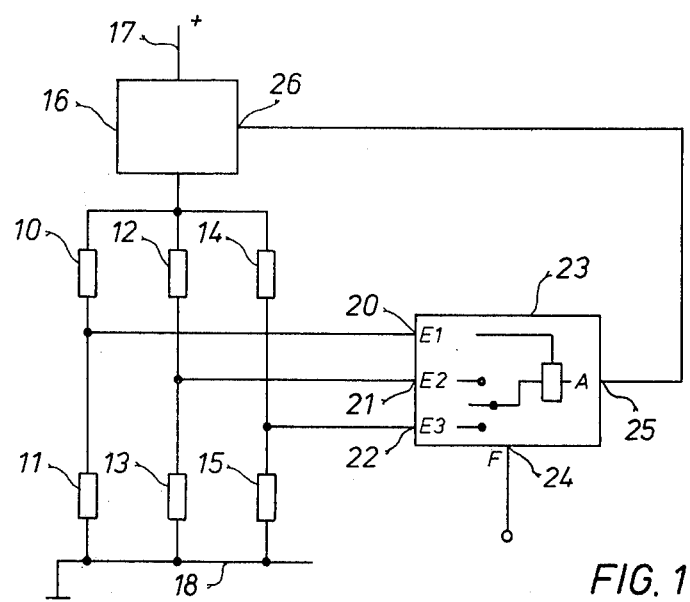
FIG. 1 is a schematic block circuit diagram of the device for flowthrough rate measurement according to the invention.

FIG. 1 is a simplistic schematic illustration of a bridge circuit, comprising three voltage dividers having a hot wire 10, a measuring resistor 11, a temperature-dependent resistor 12, a further resistor 13 and a third voltage divider comprising two further resistors 14 and 15. The parallel circuit of the three voltage dividers is disposed in series with an electric-current control circuit 16 between a positive line 17 and a ground line 18. The respective linkage points of the individual resistors of the various dividers are carried to inputs 20, 21 and 22 of a regulator 23 having a further control input 24 and an output 25. The output 25 is connected with a control input 26 of the electric-current control device 16.

In the regulator 23, an alternating switch is shown, which symbolizes the fundamental principle of the device; that is, depending upon the manner in which the measuring device functions, different second dividers are assigned to the voltage divider having the hot wire. The divider for the measurement function has a temperature-dependent resistor disposed in the air flow, while the divider for the burn-off function does not have this characteristic and operates with a constant resistance instead.

Figure 2:
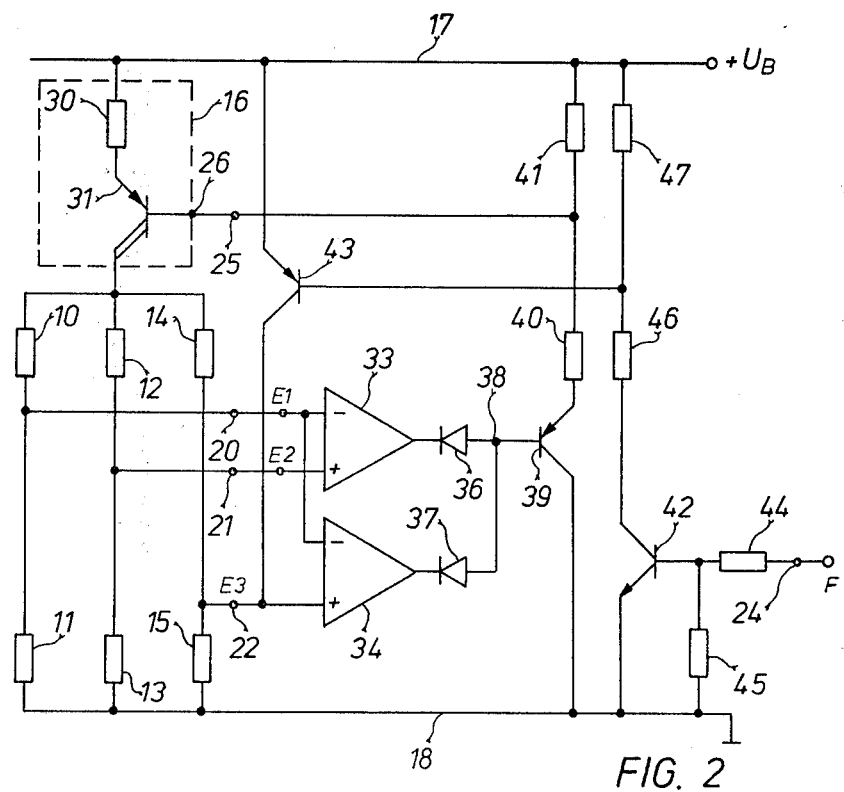
FIG. 2 shows a first detailed embodiment of the device.

FIG. 2 shows the subject of FIG. 1 in greater detail. Identical elements are given identical reference numerals.

The current control device 16, according to FIG. 2, comprises a series circuit made up of a resistor 30 and a transistor 31. With its base, the transistor 31 is connected to the output 25 of the regulator 23 of FIG. 1, while on its collector side it is connected with the junction point of the individual voltage dividers.

The primary component of the regulating circuit 23, which is shown as the regulator 23 in FIG. 1 and is shown in greater detail in FIG. 2, is two operational amplifiers 33 and 34. The negative inputs of the two operational amplifiers 33 and 34 are combined and connected to the input 20—that is, to the junction point between the resistors 10 and 11. In contrast to this, the positive input of the amplifier 33 is coupled with input 21, while the positive input of the amplifier 34 is coupled with the input 22. On the output side, both amplifiers 33 and 34 are connected via respective diodes 36 and 37 to a junction point 38, which is connected in turn with the base of a transistor 39. On its collector side, this transistor 39 is connected to the ground line 18, while on its emitter side it is connected via a series circuit of two resistors 40 and 41 to the positive line 17. The junction point of these two resistors 40 and 41 represents the output 25 of the regulating circuit 23, and the signal which appears at this point controls the transistor 31 of the current control circuit 16 via the input 26.

The burn-off procedure is controlled on the basis of a signal at the input 24 via two transistors 42 and 43. The base of the transistor 42 is connected via a resistor 44 with the input 24 and via a resistor 45 with the ground line 18. On the emitter side, the transistor 42 is coupled directly to the ground line 18, while on the collector side a series circuit comprising two resistors 46 and 47 leads to the positive line 17. The signal of the junction point of the two resistors 46 and 47 controls the base of the transistor 43, which is connected by its emitter with the positive line 17 and by its collector with the positive input of the amplifier 43.

During operation of the measuring device, the transistor 42 and accordingly the transistor 43 as well are switched open. As a result, a very high potential is present at the output of the amplifier 43. However, because of the polarity of the diode 37, this potential is not switched through to the base of the following transistor 39. The regulation of the electric current by means of the transistor 31 is thus effected with the output signal of the amplifier 33 and in accordance with the diagonal voltage of the bridge formed by the resistors 10–13.

In order to burn off deposits from the hot wire 10, the two transistors 42 and 43 are blocked. Since the resistance ratio between the two resistors 15, 14 is substantially smaller than that between the resistors 13, 12, the amplifier 44 is at the first instant triggered such that the output voltage drops toward zero, and the current control device 16 is opened as a result. The amplifier 33 now strives to counteract this increase in electric current by means of a more-positive output voltage. However, this causes the diode 36 to assume its blocked state, and the regulation of electric current is determined solely by the amplifier 34. In this manner, a switchover from one amplifier to the other is effected. This means that the resistance value of the temperature-dependent resistor 12 can no longer influence the total electric current.

Figure 3:
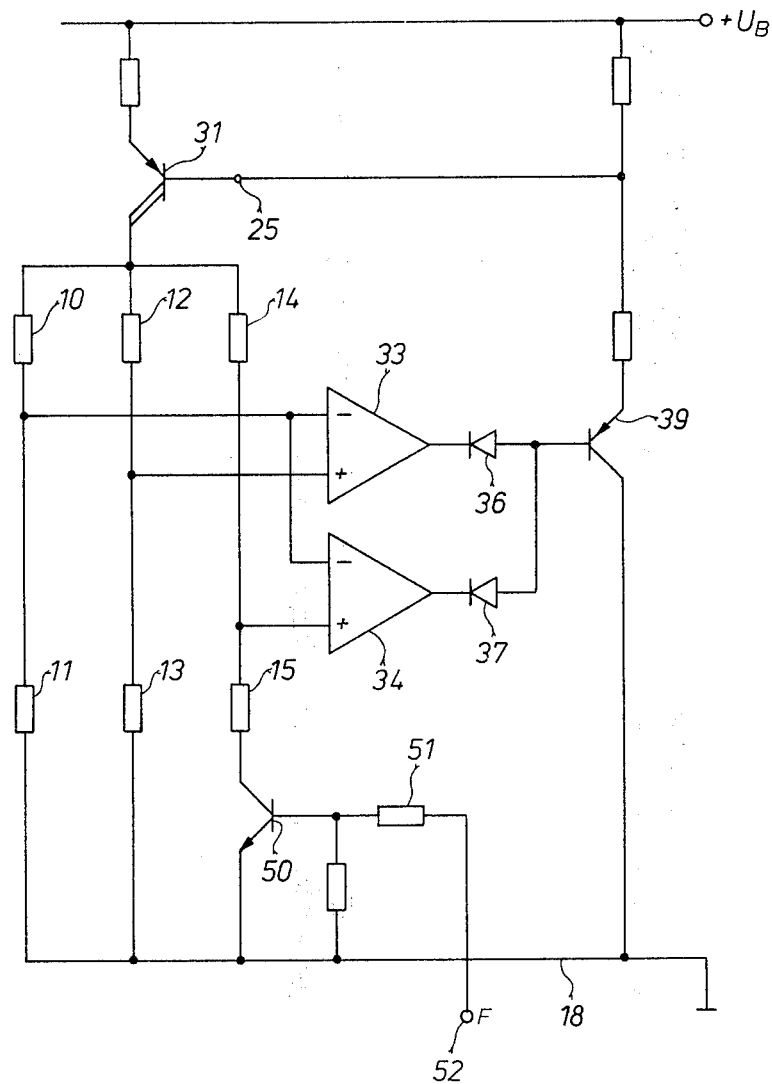
FIG. 3 shows a second form of embodiment of the device.

FIG. 3 shows a second exemplary embodiment of the device according to the invention. In the subject of FIG. 2 the two transistors 42 and 43 are switched open for the duration of measurement operation, and a potential is thus present at the positive input of the amplifier 34 which is virtually the same as the operating voltage. In contrast, this increase in potential is effected in the subject of FIG. 3 by interrupting the electric current in the voltage divider realized by the resistors 14 and 15 of the negative or ground line 18. This is realized by means of a transistor 50 in series with the resistor 15 between the positive terminal of the operational amplifier 34 and the ground line 18. This transistor 50 is triggered via a resistor 51 from the direction of a connection point 52 for the signal pertaining respectively to the measurement operation or the burn-off procedure. Otherwise, the subjects of FIGS. 2 and 3 have the same details in terms of circuitry.

If operational amplifiers having an "open collector output" (such as TAA 765) are used, then the diodes 36 and 37 may be eliminated from both exemplary embodiments shown in FIGS. 2 and 3.

Figure 4:
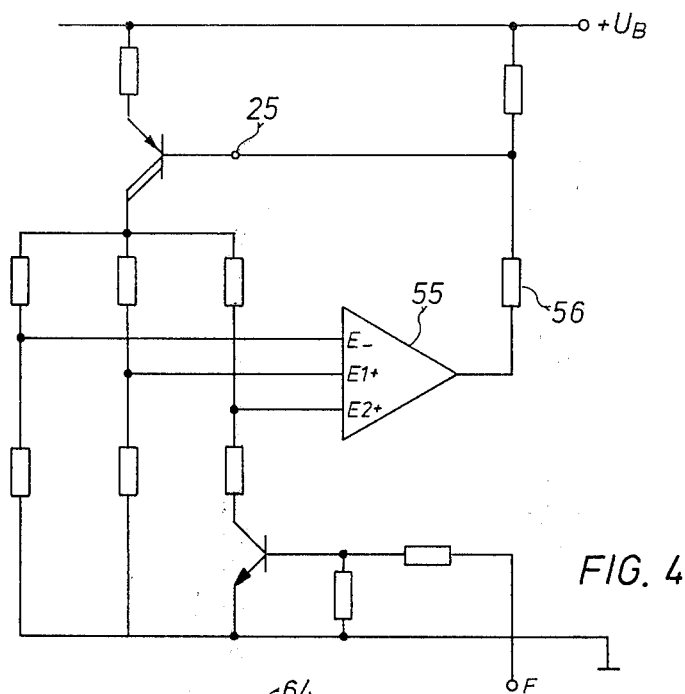
FIG. 4 shows a third form of embodiment of the device; and, finally.

FIG. 4 shows a modified embodiment of the subject of FIG. 3, having only a single, albeit modified, operational amplifier 55. It has a common negative input and two positive inputs; on the output side, it is coupled via a resistor 56 with the connection point 25 already indicated in FIG. 1. Naturally, this operational amplifier can also be used in a circuit embodied such that the switchover from measurement operation to the burn-off procedure is effected in the manner described in connection with FIG. 2.

Figure 5:
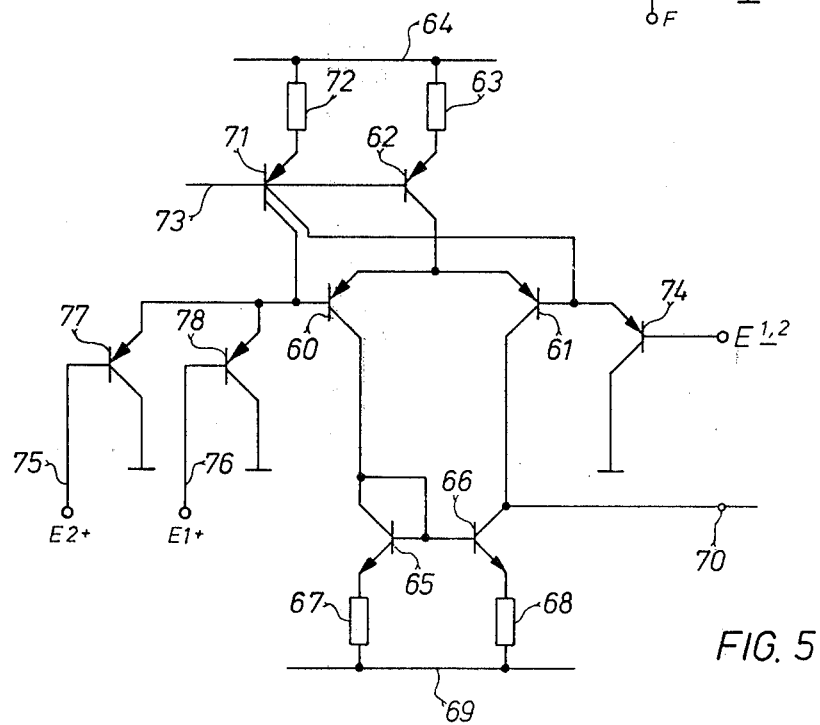
FIG. 5 shows a differential amplifier for the subject of FIG. 4 which is suitable for integration purposes.

FIG. 5 shows the circuit layout of the amplifier 55 shown in FIG. 4. With a view to the desired integration, this amplifier 55 is made up solely of semiconductor components and resistors. Its primary components are two PNP transistors 60 and 61, which are switched together on the emitter side and are connected with a positive line 64 via a transistor 62 and a resistor 63. The collectors of the two transistors 60 and 61 are connected in series, together with one transistor 65 and 66 and one resistor 67 and 68 each respectively, to the negative line 69. At the base, the two transistors 65 and 66 are connected together, as are the base and collector of the transistor 65. The output signal of this assembly can be picked up at the collector of the transistor 66 and is available for use at a connection terminal 70.

The two base connections of the transistors 60 and 61 are coupled with the collectors of a dual-collector transistor 71, whose emitter is connected in turn to the positive line 64, via a resistor 72. This transistor, like transistor 62, is triggered from the direction of a common base connection line 73. The common negative input of the assembly (see FIG. 4) is connected to the base of a transistor 74 which precedes the transistor 61. The two positive inputs 75 and 76 are connected in a corresponding manner, via a transistor 77 and 78, respectively, to the base of the transistor 60.

The circuit layout shown in FIG. 5 is known in principle. It functions in such a manner that the lowest input potential at a particular time comes into effect at one of the positive inputs 75 and 76.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A burnout device for flowthrough rate measurement for measuring the air throughput in the intake tube of an internal combustion engine comprising:
   a bridge circuit assembly having at least three voltage dividers connected to respective control voltages,
   a heated resistance material disposed in the flow of the medium included in one of said voltage dividers and at which a control voltage is connected for regulating the electric current through said resistance material,
   means for selectively connecting either one of the remaining two of said voltage dividers in conjunction with said one of said voltage dividers for a measurement or a burn-off operation, and
   control means responsive to said bridge circuit assembly for controlling said control voltage for regulating the electric current to said heated resistance material.

2. A device as defined by claim 1, wherein during burn-off said heated resistance material is independent of the temperature of the medium to be measured.

3. A device as defined by claim 1, wherein said control voltages are delivered to a regulating amplifier and that in accordance with a further control variable one of said respective control voltages influences the output of the regulating amplifier.

4. A device as defined by claim 3, wherein the regulating amplifier includes two operational amplifiers to which said respective control voltages can be delivered at the input side and which on the output side is selectively connected via diodes with a coupling point.

5. A device as defined by at least one of the claims 1 or 4, wherein one of said voltage dividers is uncoupled by means of a switch from an operational voltage line.

6. A device as defined by at least one of the claims 1 or 4, wherein a pickup point of said bridge circuit assembly is subjected, during measurement operation of the device, to a predetermined potential.

7. A device as defined by claim 1, wherein said heated resistance material is a hot wire.

8. A device as defined by claim 1, wherein said heated resistance material is a hot film.

* * * * *